US008984418B2

(12) United States Patent
Adachi et al.

(10) Patent No.: US 8,984,418 B2
(45) Date of Patent: *Mar. 17, 2015

(54) DELEGATION OF DATA ENTRY TASKS

(75) Inventors: Hisatoshi Adachi, Komae (JP); Masaki Wakao, Sagamihara (JP); Masato Noguchi, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 1324 days.

This patent is subject to a terminal disclaimer.

(21) Appl. No.: 11/970,395

(22) Filed: Jan. 7, 2008

(65) Prior Publication Data

US 2009/0150799 A1   Jun. 11, 2009

Related U.S. Application Data

(63) Continuation of application No. 11/953,407, filed on Dec. 10, 2007.

(51) Int. Cl.
*G06F 3/00* (2006.01)
*G06Q 10/10* (2012.01)
*G06Q 10/06* (2012.01)

(52) U.S. Cl.
CPC ............... *G06Q 10/10* (2013.01); *G06Q 10/06* (2013.01)
USPC .......................................... 715/751; 715/780

(58) Field of Classification Search
CPC ..... G06Q 10/103; G06Q 10/06; G06F 17/241
USPC .......................................... 715/751, 780, 975
See application file for complete search history.

(56) References Cited

U.S. PATENT DOCUMENTS

| | | | | |
|---|---|---|---|---|
| 6,678,714 | B1* | 1/2004 | Olapurath et al. | 718/104 |
| 7,437,320 | B2* | 10/2008 | Davidson et al. | 705/7.11 |
| 7,472,341 | B2* | 12/2008 | Albornoz et al. | 715/230 |
| 7,584,268 | B2* | 9/2009 | Kraus et al. | 709/218 |
| 7,882,565 | B2* | 2/2011 | Collins et al. | 726/27 |
| 2001/0042032 | A1* | 11/2001 | Crawshaw et al. | 705/32 |
| 2002/0120482 | A1* | 8/2002 | Anderson et al. | 705/7 |
| 2003/0078880 | A1* | 4/2003 | Alley et al. | 705/38 |
| 2005/0108396 | A1* | 5/2005 | Bittner | 709/225 |
| 2005/0131777 | A1* | 6/2005 | Davidson et al. | 705/27 |
| 2005/0138031 | A1* | 6/2005 | Wefers | 707/9 |
| 2005/0195426 | A1* | 9/2005 | Archbold | 358/1.15 |
| 2005/0195427 | A1* | 9/2005 | Archbold | 358/1.15 |
| 2005/0195428 | A1* | 9/2005 | Archbold | 358/1.15 |

(Continued)

FOREIGN PATENT DOCUMENTS

| | | |
|---|---|---|
| JP | 2002279166 A | 9/2002 |
| JP | 2002316645 A | 10/2002 |

(Continued)

*Primary Examiner* — Shen Shiau

(74) *Attorney, Agent, or Firm* — Steven M. Greenberg, Esq.; CRGO Law

(57) ABSTRACT

To avoid the need for off-line collaboration, a primary user who is attempting to enter data required for computer-based process may, as part of the data entry process, delegate data entry tasks for specific input fields to designated delegate users who are more likely to be knowledgeable about the data to be entered. Data entry operations performed by the primary user are recorded and used to build a transaction model which will enable a server to provide required data input screens to delegate users. Data entered by the delegate users is merged with data entered by the primary user to meet the requirements of the computer-based process.

16 Claims, 15 Drawing Sheets

(56) References Cited

U.S. PATENT DOCUMENTS

| | | | |
|---|---|---|---|
| 2005/0195429 A1* | 9/2005 | Archbold | 358/1.15 |
| 2005/0197999 A1* | 9/2005 | Kumar | 707/1 |
| 2005/0267792 A1* | 12/2005 | Mehrotra et al. | 705/9 |
| 2006/0090071 A1* | 4/2006 | Sinzig et al. | 713/166 |
| 2006/0101328 A1* | 5/2006 | Albornoz et al. | 715/512 |
| 2006/0136495 A1* | 6/2006 | Schaad | 707/104.1 |
| 2006/0149567 A1* | 7/2006 | Muller et al. | 705/1 |
| 2006/0235984 A1* | 10/2006 | Kraus et al. | 709/228 |
| 2007/0016460 A1* | 1/2007 | Weiss | 705/8 |
| 2007/0016465 A1* | 1/2007 | Schaad | 705/9 |
| 2007/0056045 A1* | 3/2007 | Collins et al. | 726/27 |
| 2007/0198317 A1* | 8/2007 | Harthcryde et al. | 705/8 |
| 2007/0198977 A1* | 8/2007 | Abernethy et al. | 718/100 |
| 2009/0119601 A1* | 5/2009 | Adachi et al. | 715/753 |

FOREIGN PATENT DOCUMENTS

| | | |
|---|---|---|
| JP | 2003323531 A | 11/2003 |
| JP | 2004334379 A | 11/2004 |
| JP | 2005321937 A | 11/2005 |
| JP | 2006079469 | 3/2006 |
| JP | 2006236003 A | 9/2006 |
| WO | WO 2008084665 A1 * | 7/2008 |

* cited by examiner

DELEGATION OF DATA ENTRY TASKS

CROSS-REFERENCE TO RELATED APPLICATION

This application is a continuation of U.S. patent application Ser. No. 11/953,407 entitled DELEGATION OF DATA ENTRY TASKS, field Dec. 10, 2007, the entire teachings of which are incorporated herein by reference.

BACKGROUND OF THE INVENTION

The present invention relates generally to information processing, and more particularly to delegation of data entry tasks by a primary user to one or more delegate users.

It is not uncommon for enterprise data processing systems to make use of web-based applications as user interfaces to the systems. As one example, an enterprise expense reimbursement system may support the use of a web-based user data entry application that runs on a networked personal computer and allows an employee to enter an itinerary, travel expenses, lodging expenses, accounting codes and other information into input fields in a data entry screen called up through a web browser. The entered data is transmitted to an application server for processing of the entered data.

One advantage of web-based data entry applications is that they are available to any employee with web access, whether the employee is working side-by-side with other employees or remotely. If an employee using a web-based data entry application cannot provide all of the information required by the application (for example, required accounting codes) and has no one nearby to ask, the employee must at least temporarily leave the data entry application and try to acquire the necessary information from another employee before returning to the data entry application to complete the data entry process. The steps described above are time consuming and distracting both for the employee who must interrupt the data entry task to ask for help and for any employee who is asked to provide such help.

There is a need for an information data entry system that does not require the use of "off-line" data acquisition of the type described above.

BRIEF SUMMARY OF THE INVENTION

The invention may be implemented as a method for acquiring data required for performance of a computer-based process. A primary user provides one or more data inputs, each of the inputs taking the form of data entered into an input field on a data input display screen. The primary user may also designate at least one delegate user to whom the primary user is delegating a responsibility to provide a data input for a particular input field. Each designated delegate user is requested to provide the data input. Inputs provided by delegate users are received.

The invention may also be implemented as a computer program product for acquiring data required for performance of a computer-based process. The computer program product includes a computer-usable medium embodying computer usable program code configured to receive data inputs from a primary user, each data input taking the form of data entered into an input field on a data input display screen available to the primary user. The computer program product also includes program code configured to receive, from the primary user, designations of one or more delegate users to whom the primary user is delegating the responsibility of providing data for particular input fields. A computer program product further includes program code configured to request data from each designated delegate user and program code configured to receive data from a least one delegate user.

The invention may also be implemented as a system for acquiring data required for performance of a computer-based process. The system includes logic for receiving, from a primary user, one or more data inputs provided as data entered into input fields in a data input display screen and at least one designation of a delegate user to whom the primary user is delegating the responsibility of providing data for a particular input field. The system further includes logic for requesting data input from each delegate user and logic for receiving data input provided by at least one delegate user The invention may also be implemented as a method for performing a computer-based process. One or more data inputs required by the computer-based process is received from a primary user with each data input being provided as data entered into an input field on a data input display screen available to the primary user. Also received from the primary user are one or more designations of delegate users for whom the primary user is delegating the responsibility of providing data input for particular input fields. Each delegate user is requested to provide data input. Inputs from delegate users are received and used along with data provided by the primary user to perform the computer-based process.

The invention may also be implemented as a computer program product for performing a computer-based process. A computer program product includes a computer usable medium having computer usable program code configured to receive data input from a primary user with each data input taking the form of data entered into an input field on the data input display screen available to the primary user. The computer program product also includes program code for receiving, from the primary user, the designations of one or more delegate users to whom the primary user is delegating responsibility for providing data input for particular input fields. A computer program product further includes program code for requesting data input from each of the designated delegate users, for receiving data input from the designated delegate users, and for performing the computer-based process using data inputs received from the primary user and one or more of the designated delegate users.

BRIEF DESCRIPTION OF THE SEVERAL VIEWS OF THE DRAWINGS

FIG. 14 is an example of an input screen on which marking of a designated delegate input user is made in the described embodiment of the present invention.

FIG. 15 is an example of an interface for inputting particular selections in the described embodiment of the present invention.

FIG. 16 is an example of an input screen on which only the input field to be inputted by a delegate is made to accept the input in the described embodiment of the present invention.

DETAILED DESCRIPTION OF THE INVENTION

Figure 1:
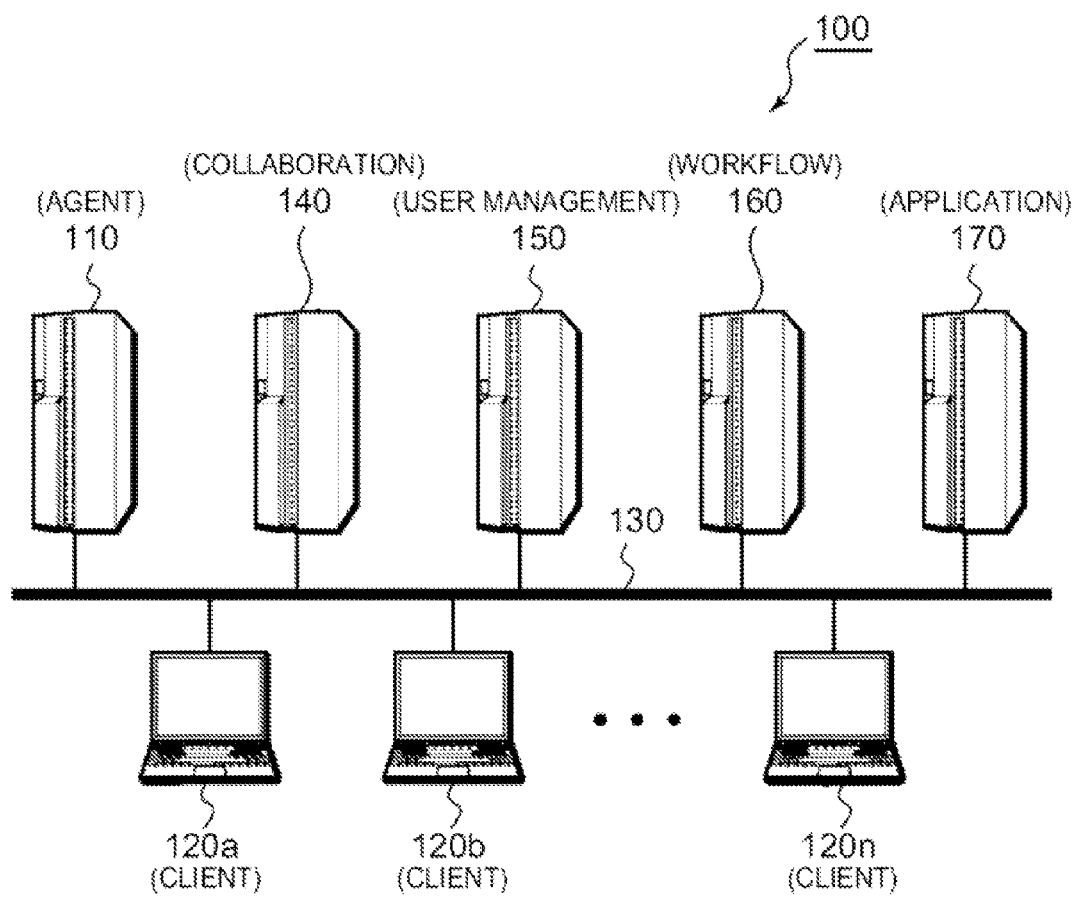
FIG. 1 is a high-level, overall schematic diagram of a data processing system according to an embodiment of the present invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a high-level, overall schematic diagram of a system 100 according to an embodiment of the present invention. The system 100 includes an agent server 110, clients 120a, 120b, ..., 120n (collectively referred to as "client(s) 120"), a collaboration server 140, a user management server 150, a workflow server 160, and an application server 170, all of which are connected to each other via a network 130. It should be understood that what is portrayed as a single network 130 may actually consist of multiple, interconnected networks, each having different properties, and that certain of the illustrated devices may be connected only to one of the multiple networks. For example, one or more of the clients 120 may be connected to a public wide area network, such as the Internet, while other of the clients and the various servers mentioned above may be connected to a local area network accessible only within an enterprise that owns the various servers.

The agent server 110 is used in designating delegate users (users to whom a primary user has delegated the task of providing data for one or more input fields on data entry screens associated with a particular application), creating a workflow process control the entry of data by delegate users, creating the user interfaces required by the delegate users to complete the data entry tasks that have been delegated to them, and processing the data entered by the delegate users. The functions and operations of the agent server 110 are described later in more detail.

Each of the clients 120 may be implemented on a personal computer (or comparable device) used primarily by a single user. At least some of the clients 120 may include a web browser that allows the client 120 (specifically, the user of the client) to interact via the web browser with another computer connected to the network 130. In one embodiment of the present invention, a browser plug-in is downloaded from the agent server 110 and installed in any such client 120 to add advanced function required in implementing the present invention. The advanced function will be described later in more detail.

For purposes of the present invention, client users can be categorized as belonging to one of two groups. A "primary user" is a user who enters data either on his own behalf or on behalf of a supported principal. An example of the latter type of primary user is an administrative assistant that enters data on behalf of a boss. A "delegate user" is a user to whom the task of entering data has been delegated by a "primary user" in accordance with the present invention. For purposes of illustration, it is assumed that client terminal 120a is used by a primary user while client terminal 120b is used by a delegate user.

In the course of a data entry operation initiated by the primary user, the primary user may delegate the task of providing data for an input field to a delegate user. The agent server 110 receives a designation of the delegate user and the input field, generates an instruction defining the task to be performed by the delegate user, and transmits the instruction to the workflow server 160. Further, the agent server 110 provides the delegate user with an interface for performing the delegated input task and uses the data inputted by the delegate user to carry out processing on behalf of the application server. The functions and operations of the agent server 110 will be described later in detail.

The collaboration server 140 provides a service that enables the employees of the enterprise owning the network system 100 to collaborate by exchanging information with each other. More specifically, the collaboration server 140 provides an instant messaging service, an electronic mail service, and perhaps other services. In the embodiment of the present invention, the agent server 110 can exchange information with the clients 120 using the services provided by the collaboration server 140.

The user management server 150 is responsible for managing information regarding the users of the network system 100, including, e.g., mail addresses and other user IDs and passwords. The user management server 150 provides the managed information over the network to applications, as appropriate, through an application programming interface (API) in an appropriate format. Applications that may need such managed information include instant messaging and/or e-mail client software.

As will be explained in more detail later, the workflow server 160 generates a workflow process for completing a data entry operation involving a primary user and one or more delegate users. The generated workflow process is based on a segmented task structure created from a model structure by the agent server 110. More detailed information about the model structure, the segmented task structure, and the workflow process created by the workflow server 160 is provided later.

The application server 170 interacts with other computer devices of the system 100 to provide data processing applications that provide business services to application users. For purposes of this description, it is assumed the application server 170 provides an expense reimbursement service to reimburse employees for travel and related expenses incurred when conducting business on behalf of the enterprise.

The representation of network 130 is a generic representation of communication paths for connecting the clients 120 and various server devices, including the agent server 110 and the application server 170. As noted earlier, what is shown as a single network may actually be multiple networks that are interconnected but that have different properties; e.g., proprietary local area networks and public wide area networks.

Figure 2:
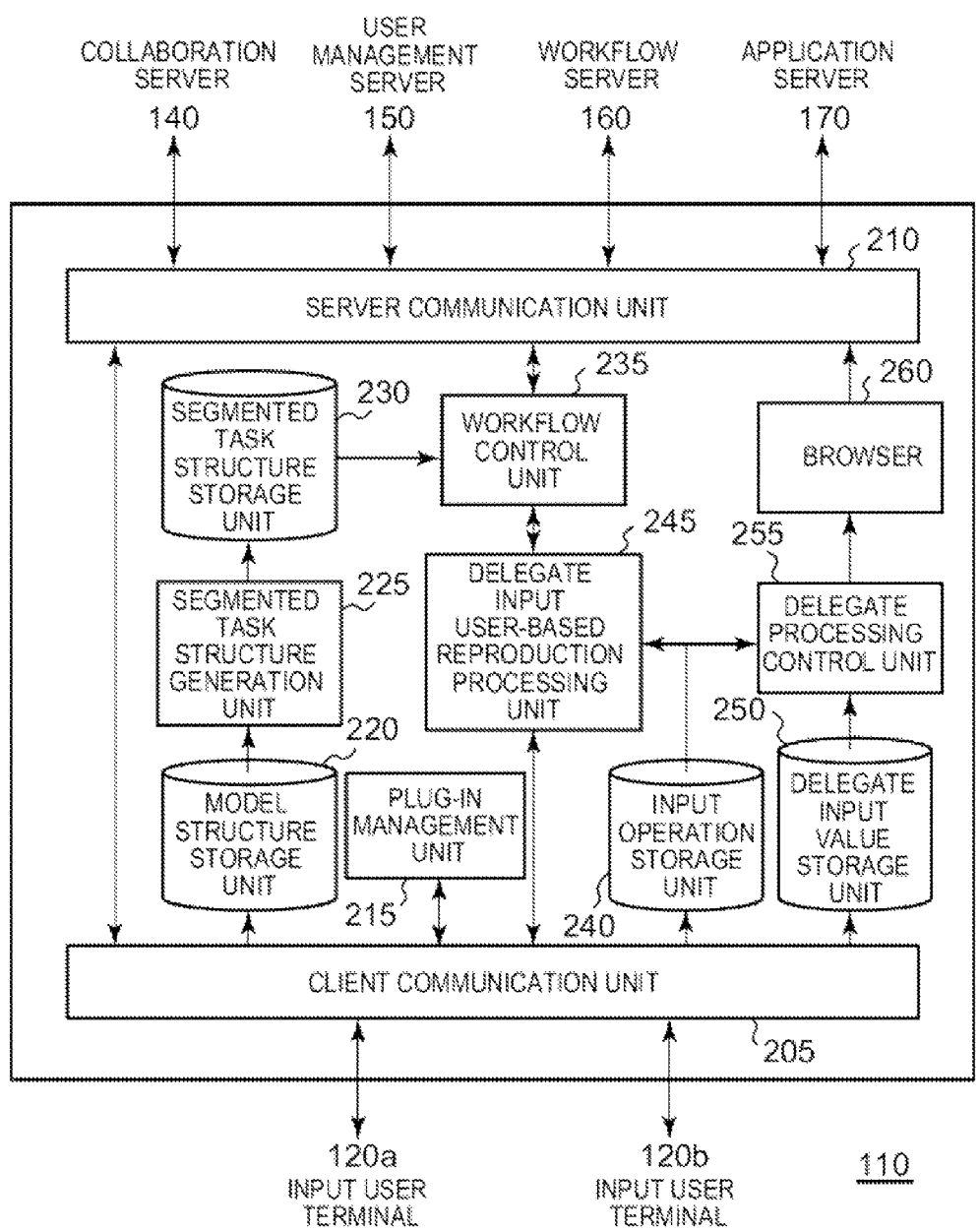
FIG. 2 is a functional block diagram of an agent server for a described embodiment of the present invention.

FIG. 2 is a functional block diagram of the agent server 110 according to one embodiment of the present invention. In the illustrated embodiment, the agent server 110 includes a client communication unit 205, a server communication unit 210, a plug-in management unit 215, a model structure storage unit 220, a segmented task structure generation unit 225, a segmented task structure storage unit 230, a workflow control unit 235, an input operation storage unit 240, a delegate input user-based reproduction processing unit 245, a delegate input value storage unit 250, a delegate processing control unit 255, and a browser 260.

The client communication unit 205 enables the agent server 110 to communicate with the clients 120, including the primary user terminal 120a and the delegate user terminal 120b. The server communication unit 210 enables the agent server 110 to communicate with the other servers connected to the network 130, including the collaboration server 140, the user management server 150, the workflow server 160, and the application server 170.

The plug-in management unit 215 stores a plug-in program that can be added to the web browser by clients 120 in accordance with the present invention. In response to a request from a client 120, the plug-in management unit 215 provides the plug-in program to a client 120 through the client communication unit 205.

As will be explained in more detail below, a data entry operation performed in accordance with the present invention requires that a primary user, assumed to be using the primary user terminal 120a, enter certain data that is used to create a data entry transaction model. The model structure storage unit 220 stores a model structure based on data received from the primary user through the client communication unit 205. The segmented task structure generation unit 225 generates a segmented task structure based on the stored model structure. The generated segmented task structure is stored in the segmented task structure storage unit 230. Further details of the model structure and the segmented task structure are provided later.

The workflow control unit 235 can generate an instruction to dynamically generate a workflow process including at least one delegate input task corresponding to a delegate input user assigned the input task, based on the segmented task structure stored in the segmented task structure storage unit 230, and to transmit the generated instruction to the workflow server 160 through the server communication unit 210. The workflow server 160, upon receiving the instruction, generates the workflow process and, subsequently, performs activation of the workflow process and management of the progress of the task(s). The contents and details in generation of the workflow process generated by the workflow server 160 will be described later.

The input operation storage unit 240 stores a record of data entry operations performed at primary user terminal 120a and received via the client communication unit 205. The record stored in input operation storage unit 240 is used when data is being entered by a delegate user at delegate user terminal 120b and when such data is processed by the delegate processing control unit 255.

When the task of providing data for a particular input field has been delegated to a delegate user and the delegate user is ready to begin that task, the processing unit 245 generates and transmits to the delegate user terminal 120b the file required to create a data input interface for the particular input field to be completed by the delegate user.

The delegated input value storage unit 250 stores a value received from the delegate user terminal 120b through the client communication unit 205.

The delegate processing control unit 255 automatically initiates the processing of data provided by delegate users on the condition that all the delegated data entry tasks have been completed. More specifically, the delegate processing control unit 255 generates a delegate processing file based on the data entry operation record stored in the input operation storage unit 240 and the data stored in the delegate input value storage unit 250 as a result of data entry operations performed by delegate users. The delegate processing control unit 255 is also capable of activating browser 260 of the agent server 110. The browser 260 includes a plug-in similar to the plug-ins installed in the clients 120. The delegate processing control unit 255 of the agent server 110 carries out reimbursement processing by interacting with the application server 170 according to the delegate processing file in the browser environment that includes the installed plug-in.

Figure 3:
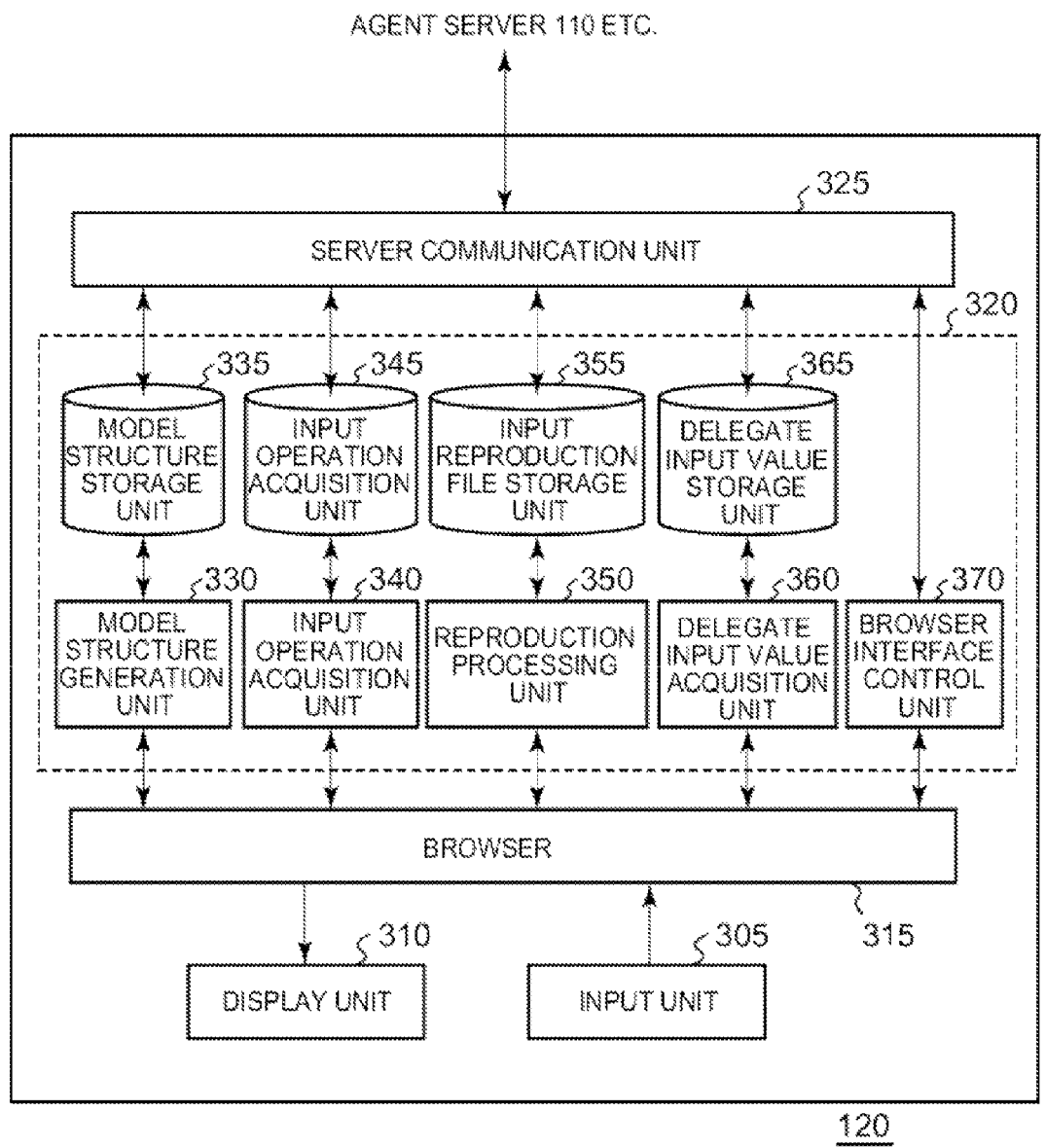
FIG. 3 is a functional block diagram of a client for the described embodiment of the present invention.

FIG. 3 is a functional block diagram of a client 120 according to an embodiment of the present invention. The client 120 includes an input unit 305, a display unit 310, a browser 315 that includes a plug-in 320, and a server communication unit 325.

The input unit 305 receives input data provided by a user of the client 120 through use of a keyboard 6 and/or a mouse 7. The display unit 310 displays information on a display device 11. The server communication unit 325 enables the client to communicate with the agent server 110 and with the other server computers connected to the network 130.

The browser 315 is application software for retrieving and rendering electronic documents such as web pages. In one embodiment of the present invention, the browser 315 can download and display files in various formats, including but not limited to HTML or XML, from a server on the network. As already noted, the normal functionality of the browser 315 is enhanced by installing a "plug-in" that provides functionality specific to the present invention. In one embodiment of the present invention, the user of the client 120 downloads the plug-in 320 from the agent server 110 and installs it at the client.

The plug-in 320, in one embodiment of the present invention, includes a model structure generation unit 330, a model structure storage unit 335, an input operation acquisition unit 340, an input operation storage unit 345, a reproduction processing unit 350, an input reproduction file storage unit 355, a delegate input value acquisition unit 360, a delegate input value storage unit 365, and a browser interface control unit 370.

When a delegate user has been designated to provide data for input field included in the input screen, the model structure generation unit 330 generates a model structure including an input screen ID, an input field ID, and a delegate user ID. The model structure storage unit 335 stores the model structure generated by the model structure generation unit 330. The model structure recorded in the model structure storage unit 335 is transmitted through the server communication unit 325 to the agent server 110 to be used for generating a segmented task structure.

The input operation acquisition unit 340 acquires all terminal operations performed by the user of the client 120 when recording is initiated in the client 120. The input operation storage unit 345 records the user terminal operations acquired by the input operation acquisition unit 340. In one embodiment of the present invention, the record of a terminal operations stored in the input operation storage unit 345 is transmitted to the agent server 110, where the record is subsequently used by the agent server 110 to reproduce operations performed in the client 120.

If a designated user accepts a request from the agent server 110 to perform a delegate user data entry task, the reproduction processing unit 350 transmits a request for an input reproduction file to the agent server 110 via the server communication unit 325. The input file received from the agent server 110 in reply to the request is stored in reproduction file storage unit 355. The reproduction processing unit 350 executes the input reproduction file stored in the input reproduction file storage unit 355 to create a data input interface for the delegate user in the browser 315.

The delegate input value acquisition unit 360 acquires data entered by a delegate user. The storage unit 365 temporarily stores data acquired by the delegate input value acquisition unit 360. Data stored in the delegate input value storage unit 365 is transmitted to the agent server 110 via the server communication unit 325.

The browser interface control unit 370 controls the graphical user interface in the browser 315. Specifically, for example, when a delegate user input mode is selected in the client 120, the browser interface control unit 370 generates an input screen including the interface for designating a delegate user from the input screen received from the application server 170, and displays the generated screen on the display unit 310.

Figure 4:
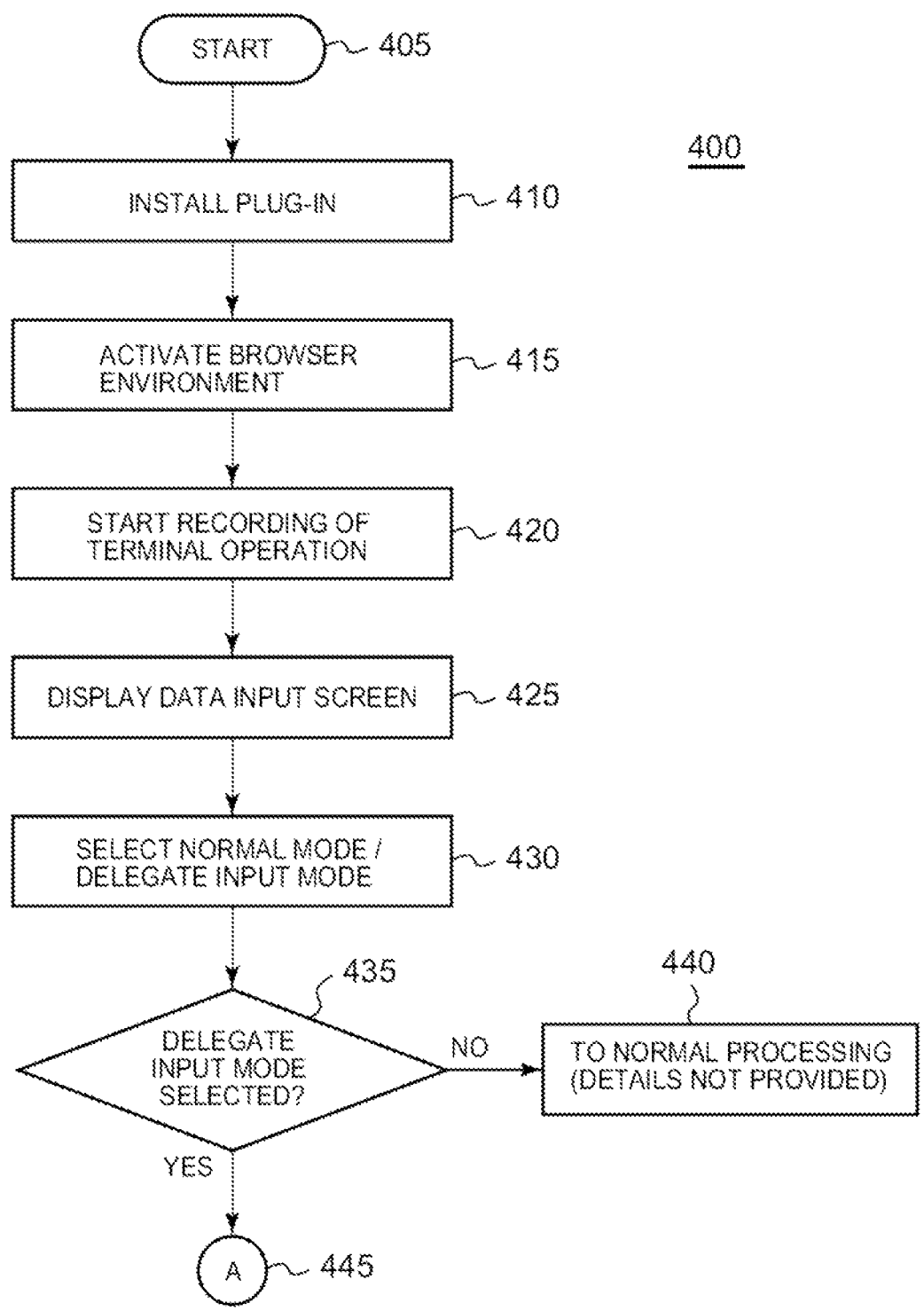
FIG. 4 is a first flowchart illustrating an operation of an input user terminal in the data processing system of the described embodiment of the present invention.

FIG. 4 is a first flowchart 400 illustrating an operation performed at the primary user terminal 120a. The process starts at step 405. In step 410, the plug-in stored in the plug-in management unit 215 of the agent server 110 is downloaded and installed on the primary user terminal 120a and the delegate user terminal 120b in response to a request from at least one user of client terminals. Installation of the plug-in is required only once for each terminal 120.

The process proceeds to step 415, in which the web browser application in primary user terminal 120a is activated, typically when the input user double-clicks on a display screen icon representing the web browser.

Next, in step 420, in response to a prescribed operation performed by the primary user (e.g., selection of an "operation recording start button" in the browser interface, recording is begun of any subsequent date entry operations performed by the primary user.

Next, in step 425, the input user requests access to applications supported by the application server 170; for example, the reimbursement processing application discussed earlier.

Application-specific screens are provided to the primary user at client terminals 120a, with at least some of those screens including one or more input fields for entering necessary data.

At step 430, the input user uses the primary user terminal 120a to select either a normal data entry mode or a delegated data entry mode. When operating in a normal data entry mode, the primary user is responsible for data input required by the application being executed in the application server 170. The delegated data entry mode is a mode in which the responsibility for providing at least some of the data required by the application being executed is delegated to another user (the delegate user).

In step 435, if it is determined that the normal data entry mode has been selected, the process proceeds to step 440, in which conventional processing is carried out based on the interaction between the application server 170 and the primary user operating terminal 120a. Data entry operations performed in the normal mode are well known and will not be described in detail.

Figure 5:
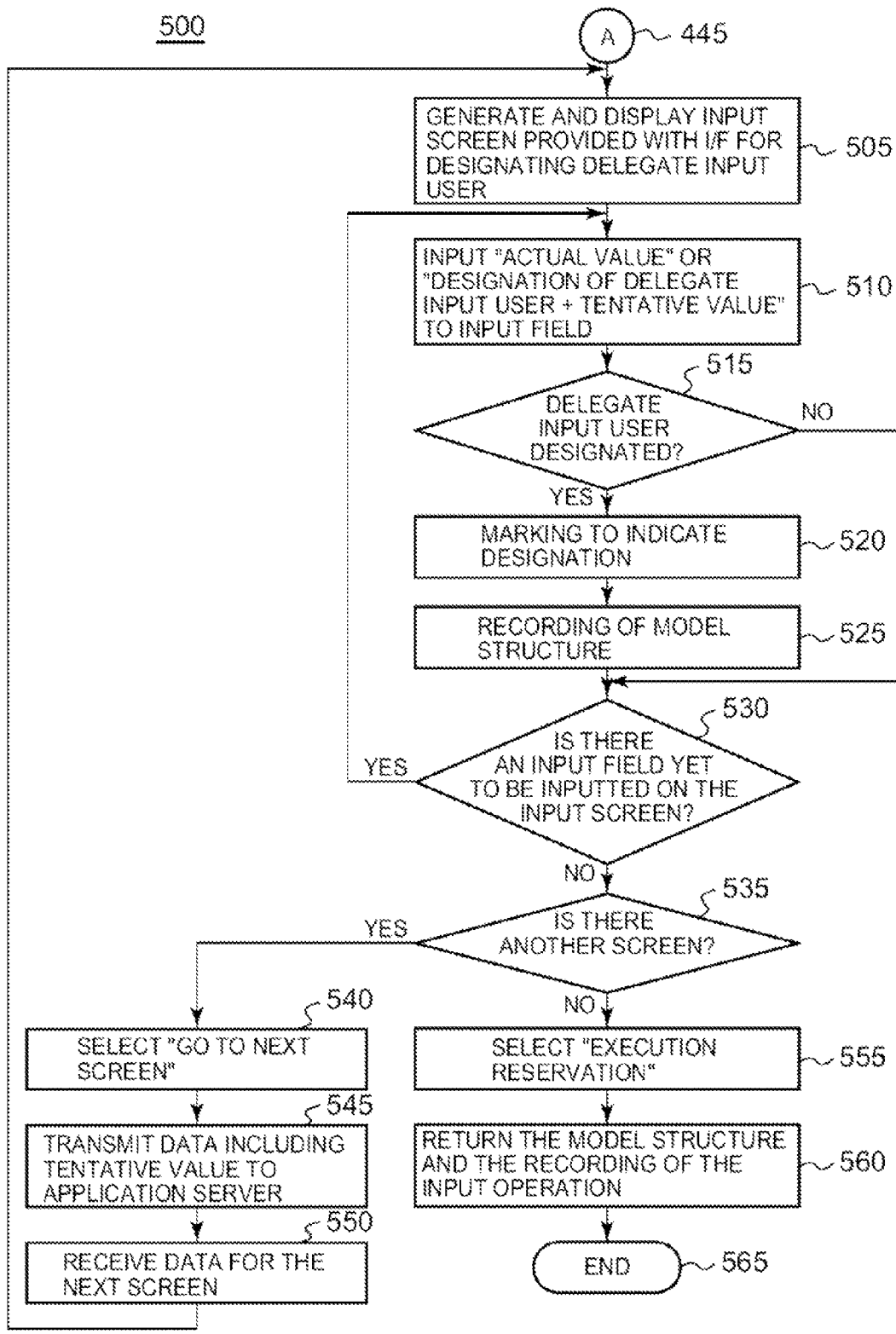
FIG. 5 is a second flowchart illustrating the operation of the input user terminal in the data processing system of the described embodiment of the present invention.

If it is determined in step 435 that the delegated data entry mode has been selected, the process proceeds to the symbol (A) corresponding to step 445 and further to step 505 in a flowchart 500 illustrated in FIG. 5.

FIG. 5 is a second flowchart 500 illustrating the operation of the primary user terminal 120a. In step 505, if a delegated data entry mode has been selected, the browser interface control unit 370 in the primary user terminal 120a generates an input screen having an interface for designating a delegate user and displays the generated input screen on the graphical user interface presented by the browser and terminal 120a.

Next, in step 510, the primary user enters either an actual value (one that is believed to be accurate by the primary user) for one of the input fields in the displayed input screen or, alternatively, enters a "designation of delegate input user". Where the primary user enters a "designation of delegate input user", the primary user may also enter a tentative value for the data called for in the input field.

Figure 13:
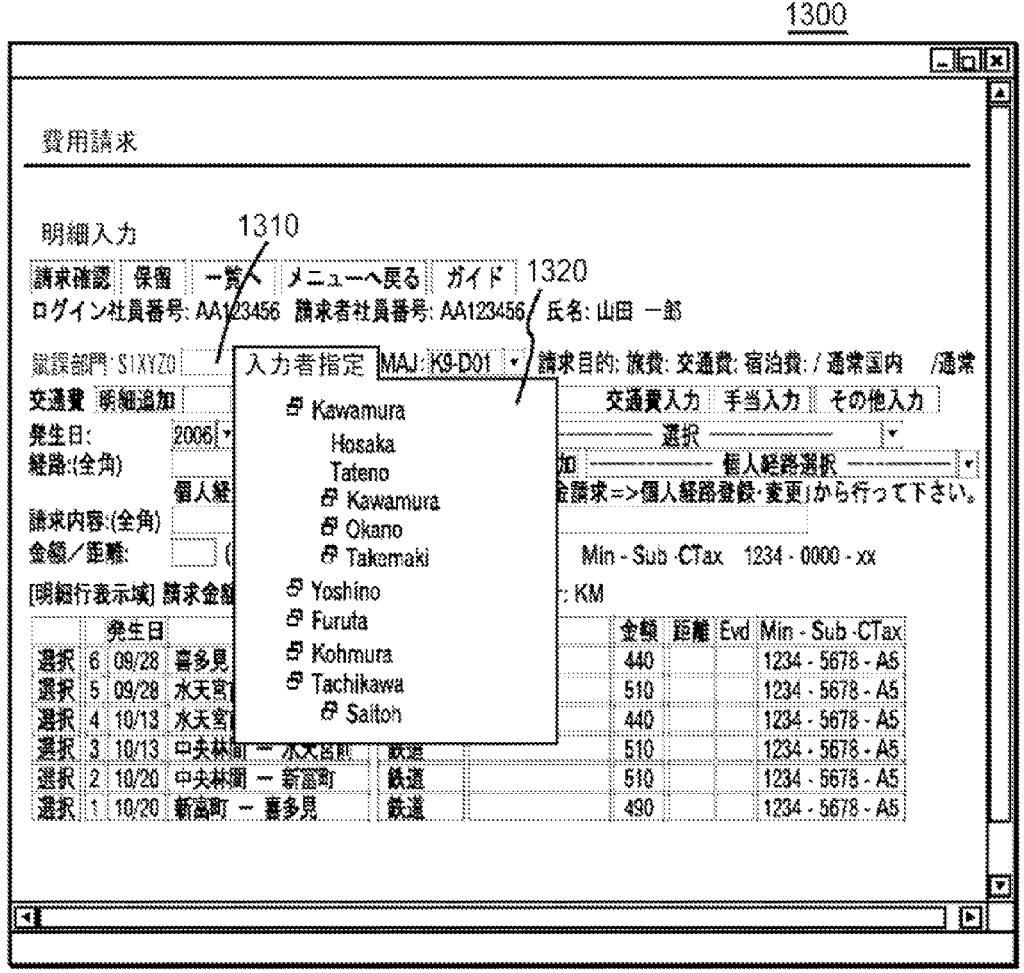
FIG. 13 is an example of an interface including a selection list for designating a delegate input user according to the described embodiment of the present invention.

More specifically, in step 510, when a delegate user is to be designated, the primary user may use the browser interface control unit 370 in the primary user terminal 120a to communicate with the user management server 150 to request a list of possible delegate users. The primary user can select a delegate user from the list, typically presented as a drop down list in the graphical user interface provided by the web browser at primary user terminal 120a. FIG. 13 is an example of a window interface including a selection list for designating a delegate user. In the window 1300 in FIG. 13, a list 1320 of possible delegate users is displayed for a particular input field 1310, such as the field in which a required department code may be entered.

Figure 14:
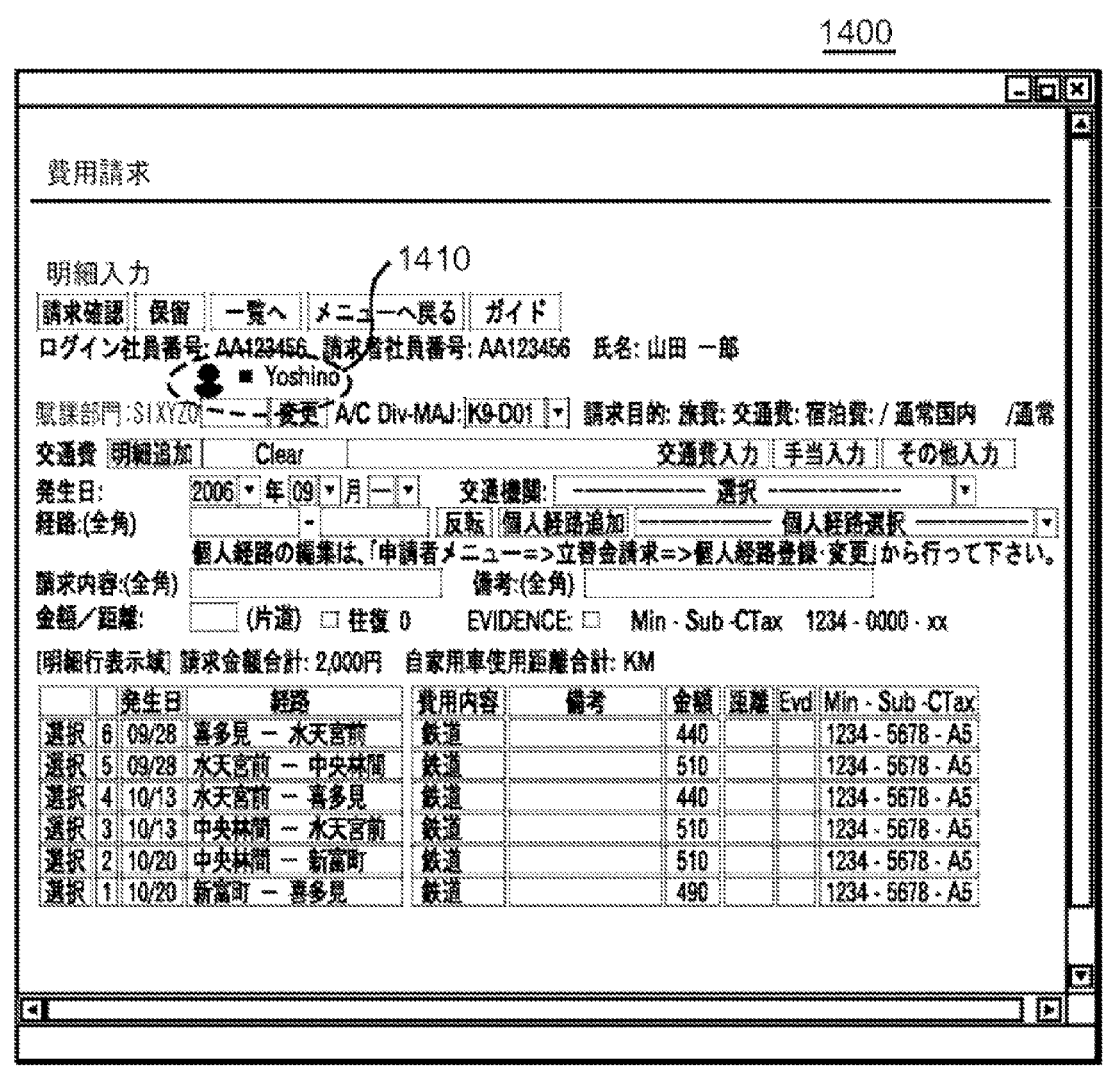

The process proceeds to step 515, in which it is determined whether a delegate user has been designated for the input field. If it is determined that a delegate user has been designated, the process proceeds to step 520, in which the input screen is annotated to identify the delegate user for the particular input field. FIG. 14 shows an example of an input screen where the screen annotation has been carried out according to an embodiment of the present invention. In FIG. 14, the annotation 1410 is added for the designated input field by the browser interface control unit 370 of the primary user terminal 120a.

The process proceeds to step 525, in which inputs provided at the primary user terminal 120a are used to create a model structure 1000 for later use in delegated data entry operations. The model structure 1000, which will be described below in detail, identifies the input field for which the delegate user data entry is required and the input screen that includes the identified input field.

After the model structure is recorded in step 525, the process proceeds to step 530. Also, where it was determined in step 515 that normal data entry operations were to be performed by the primary user, the process proceeds to step 530.

In step 530, it is determined whether there are any remaining, unfilled input fields in the currently displayed input screen. If there are, the process returns to step 510 and the steps 510 through 525 are repeated for each unfilled input field until all of the input fields have been considered, If it is determined in step 530 that all of the input fields on the currently displayed input screen have been considered, the process proceeds to step 535, where it is determined whether there still other input screens that need to be completed to provide data required by the application being treated by application server 170.

When it is determined that all of the input fields in the currently displayed input screen have been considered, the primary user uses the primary user terminal 120a to select either "GO TO NEXT SCREEN" or "EXECUTION RESERVATION". FIG. 15 shows an example of the interface for inputting the selection of either "GO TO NEXT SCREEN" or "EXECUTION RESERVATION". In the interface shown in FIG. 15, the input user selects "GO TO NEXT SCREEN" or "EXECUTION RESERVATION" from the selection list 1510 displayed by the browser interface control unit 370 at the primary user terminal 120a.

If it is determined in step 535 that one or more additional input screens need to be completed before data entry is complete, the process proceeds to step 540, where "GO TO NEXT SCREEN" is selected. Next, in step 545, in response to selection of "GO TO NEXT SCREEN", data previously entered for the currently displayed input screen, including any tentative values entered in an iteration of step 510, is transmitted to the application server 170, and data for next input screen is requested.

The process then proceeds to step 550, where the primary user terminal 120a receives (from the application server 170) the data for the next input screen requested in step 545. Thereafter, the process returns to step 505, and the steps 505 through 550 are repeated for the new input screen. The process described above is repeated until all of the input fields on all of the input screens have been considered.

If it is determined in step 535 that all application-related input screens have been considered, the process proceeds to step 555, where "EXECUTION RESERVATION" is selected by the primary user. Next, the process proceeds to step 560, where the primary user causes the model structure 1000 to be transmitted to the agent server 110. In step 560, the record of operations at the primary user terminal 120a related to the application currently being executed by application server 170 are transmitted to the agent server 110. Thereafter, the process proceeds to step 565, where the process is terminated.

Figure 6:
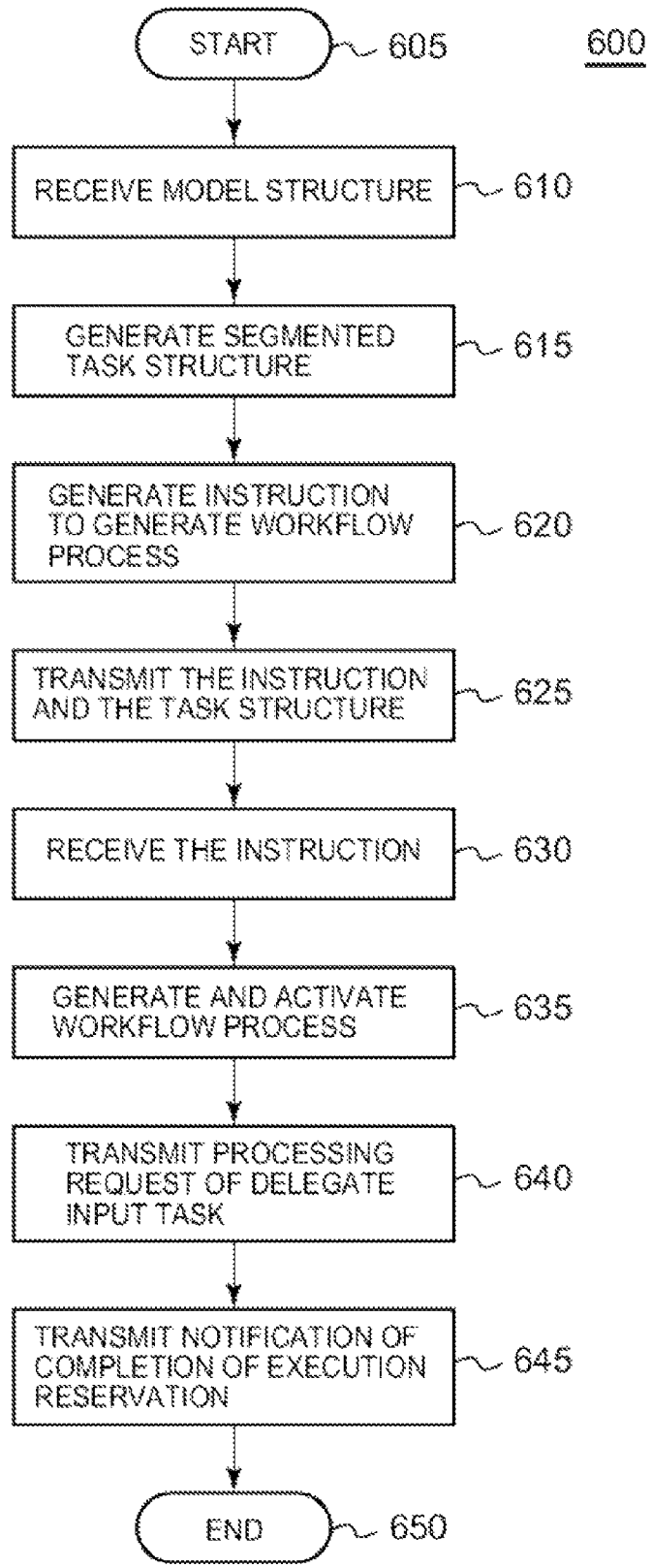
FIG. 6 is a flowchart illustrating an operation for preparation of delegate input task processing in the described embodiment of the present invention.

FIG. 6 is a flowchart 600 illustrating operations in preparation for delegate user input task processing, including generation of a workflow process. The process starts at step 605. In step 610, the agent server 110 receives the model structure 1000 transmitted by the primary user terminal 120a. In step 615, the agent server 110 interprets the received model structure 1000 to generate a segmented task structure 1100.

In step 620, the agent server 110 generates an instruction to dynamically generate a workflow process 1200 that includes at least one delegated data entry task that identifies a particular delegate user is having a responsibility to provide data for a particular input field.

At step 625, the agent server 110 transmits the instruction to generate the workflow process 1200 and the segmented task structure 1100 to the workflow server 160. In step 630, the workflow server 160 responds to the received instruction and the received segmented task structure 1100 by generating the workflow process 1200 in step 635. In one embodiment of the present invention, the generated workflow process 1200 is also activated in step 635.

In step 640, the agent server 110 uses the collaboration server 140 to transmit a request for a delegate user data entry task to the delegate user client terminal associated with the designated delegate user.

The process proceeds to step 645 where the agent server 110 transmits notification of completion of execution reservation to the primary user terminal 120a to notify the primary user of the completion of the execution reservation. Thereafter, the process proceeds to step 650, where the process is terminated.

Figure 7:
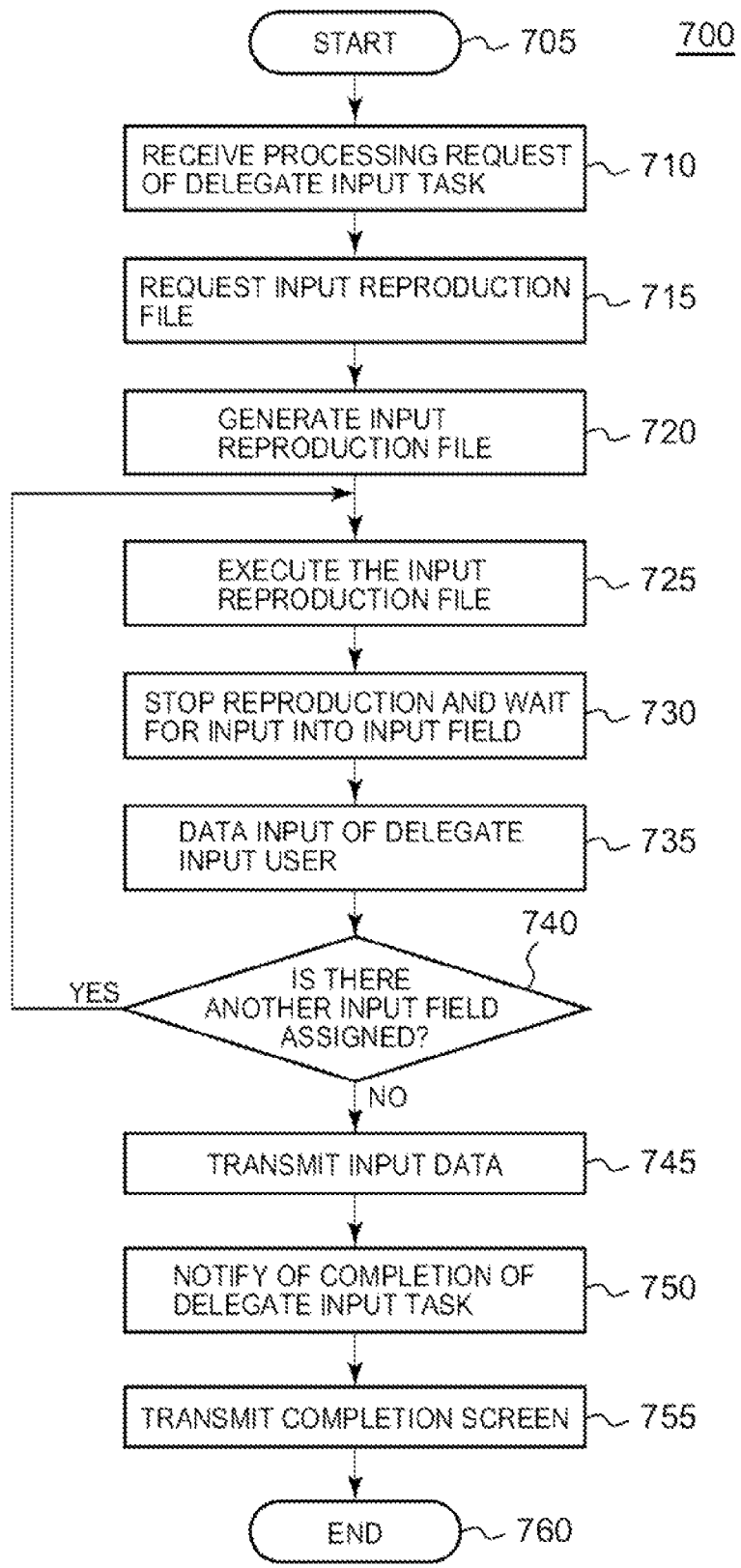
FIG. 7 is a flowchart illustrating an operation of the delegate input task processing in the described embodiment of the present invention.

FIG. 7 is a flowchart 700 illustrating an operation of delegated data entry task processing in one embodiment of the present invention. The process starts at step 705. At step 710, the delegate user terminal 120b receives a request for delegated data entry from the agent server 110, as described at step 640 in FIG. 6.

In step 715, an input file for replicating an operation originally performed by the primary user at the primary user terminal 120a at the delegate user terminal 120b is requested from the agent server 110.

In step 720, the delegate user reproduction processing unit 245 in the agent server 110 generates the input reproduction file requested by the delegate user terminal 120b in step 715, based on the segmented task structure stored in storage unit 230 and the record of the data entry operations stored in the storage unit 240. The generated input reproduction file includes the operation(s) performed by the primary user at the primary user terminal 120a, the input field(s) assigned to the delegate user and pause codes that will permit a delegate user to enter requested data into the identified input fields.

In step 725, the delegate user terminal 120b uses the above-described input reproduction file to replicate the operation(s) originally performed by the primary user at the primary user terminal 120a. It is assumed in an embodiment of the present invention that the reproduction processing requires interaction with the application server 170 via the agent server 110.

Figure 16:
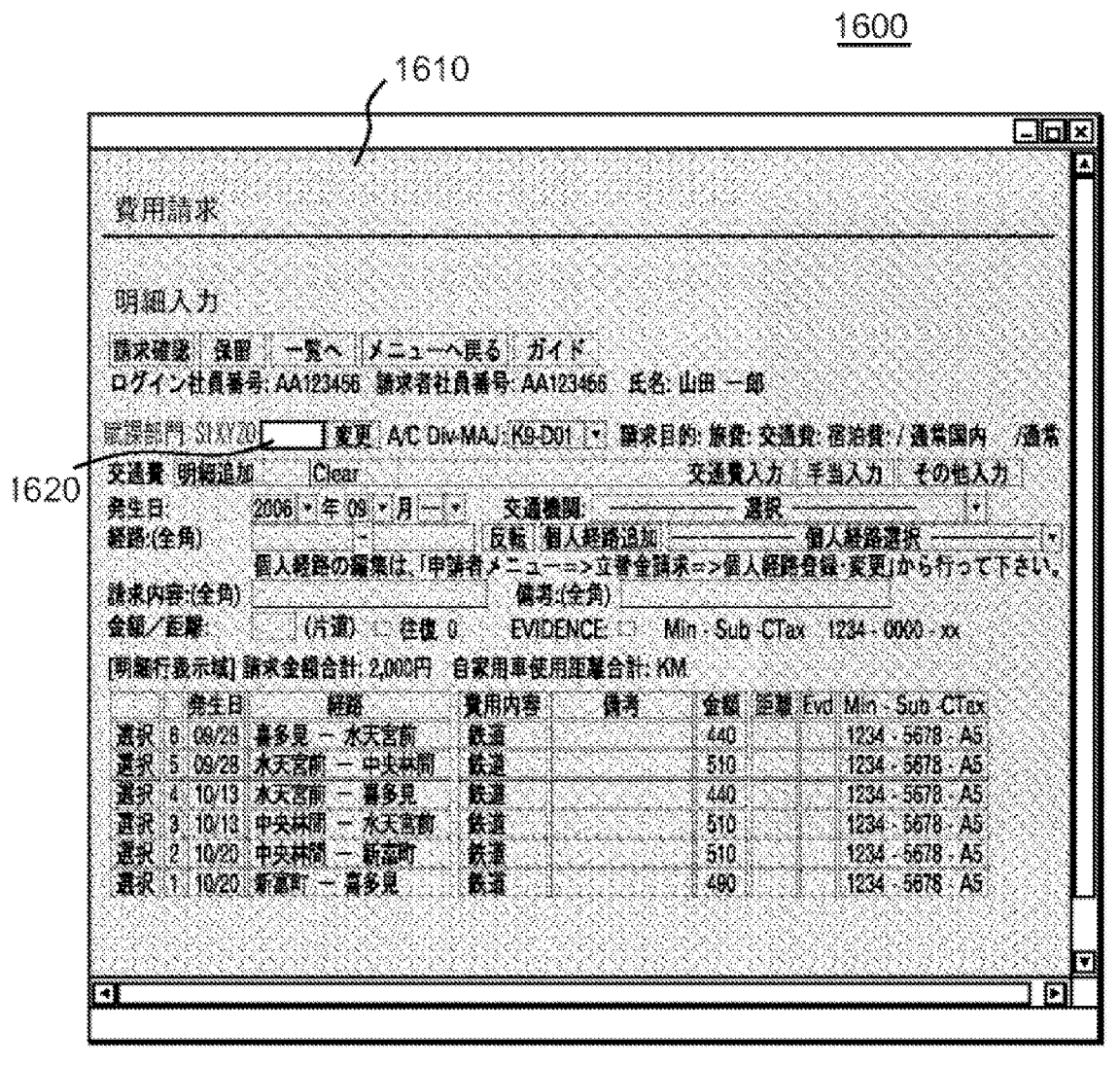

At step 730, an input screen at delegate user terminal 120b displays the input field(s) for which delegated data entry has been requested. FIG. 16 shows an example of the input screen 1600 showing an input field 1620 for which delegated data entry was requested by the primary user. It is noted that the entire screen 1600, with the exception of the input field 1620, is darkened, grayed out or otherwise altered to make it clear that data entry is to be confined to the input field 1620

At step 735, data entered into the designated input field by the delegate user is accepted.

In step 740, a determination is made whether the delegate user has been designated to provide data for another input field. If the delegate user has been designated provide data for another input field, the process returns to step 725. Steps 725 through 735 are repeated for each remaining input field. Once all of the input fields assigned to the designated delegate user have been completed, the process proceeds to step 745. In step 745, the delegate user terminal 120b transmits the input data entered by the delegate user to the agent server 110.

In step 750, in response to receipt of data entered by a delegate user and transmitted in step 745, the agent server 110 transmits notification of completion of the corresponding delegate input task to the workflow server 160. In step 755, the agent server 110 generates a delegate input task completion screen, and transmits the same to the delegate input user terminal 120b. Thereafter, the process proceeds to step 760, where the process is terminated.

Figure 8:
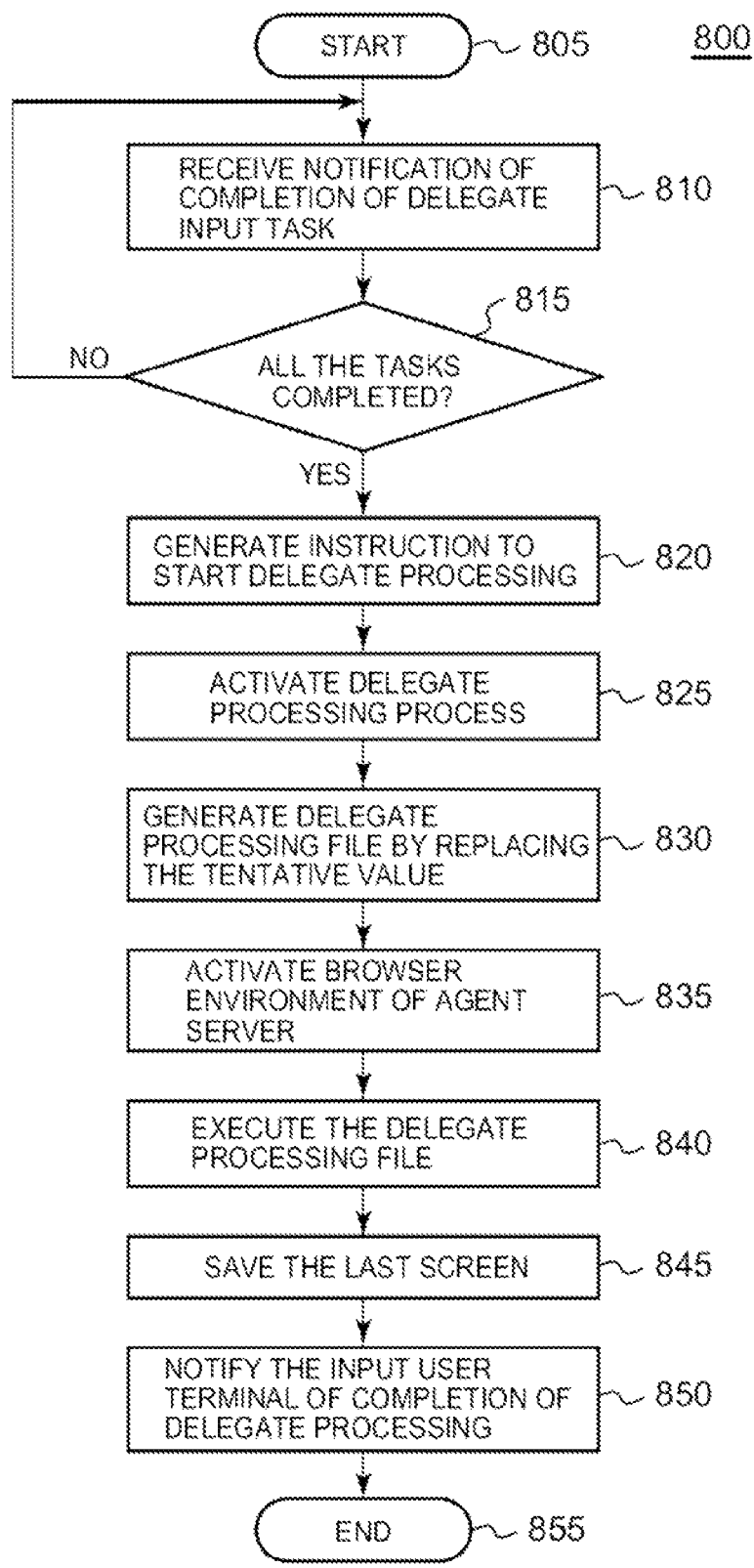
FIG. 8 is a flowchart illustrating an operation of delegate processing in the described embodiment of the present invention.

FIG. 8 is a flowchart 800 illustrating a delegate processing operation in one embodiment of the present invention. The process starts at step 805. At step 810, the workflow server 160 receives the notification of completion of the delegate user input tasks from the agent server 110.

At step 815, the workflow server 160 determines whether all delegate user data entry tasks 1230 have been completed. If any delegate user data entry task remains uncompleted, the process returns to step 810. Otherwise, the process proceeds to step 820, where the workflow server 160 generates an instruction to start the delegate processing, and transmits that instruction to the agent server 110.

Upon receiving the instruction from the workflow server 160, the agent server 110 uses the data entered by delegate users to perform the delegate processing through the following steps.

The delegate processing process starts at step 825. Subsequently, in step 830, the agent server 110 replaces any tentative value(s) originally entered by the primary user with the actual value(s) entered by the delegate user to create a delegate processing file that records the procedure for conducting the delegate processing in the browser environment. Thereafter, in step 835, the agent server 110 activates the browser for executing the delegate processing file.

In step 840, the agent server 110 executes the delegate processing file in the browser to carry out the delegate processing through the interaction with the application server 170. Subsequently, in step 845, the agent server 110 saves the last screen received from the application server 170 in the delegate processing.

The process then proceeds to step 850, where the agent server 110 transmits notification of completion of the delegated data entry processing to the primary user at terminal 120a. The notification transmitted in step 850 includes a link to the last screen of the delegate processing operations previously saved in step 845) that allows the primary user to access the last screen to confirm completion of the processing. Thereafter, the process proceeds to step 855, where the process is terminated.

Figure 10:
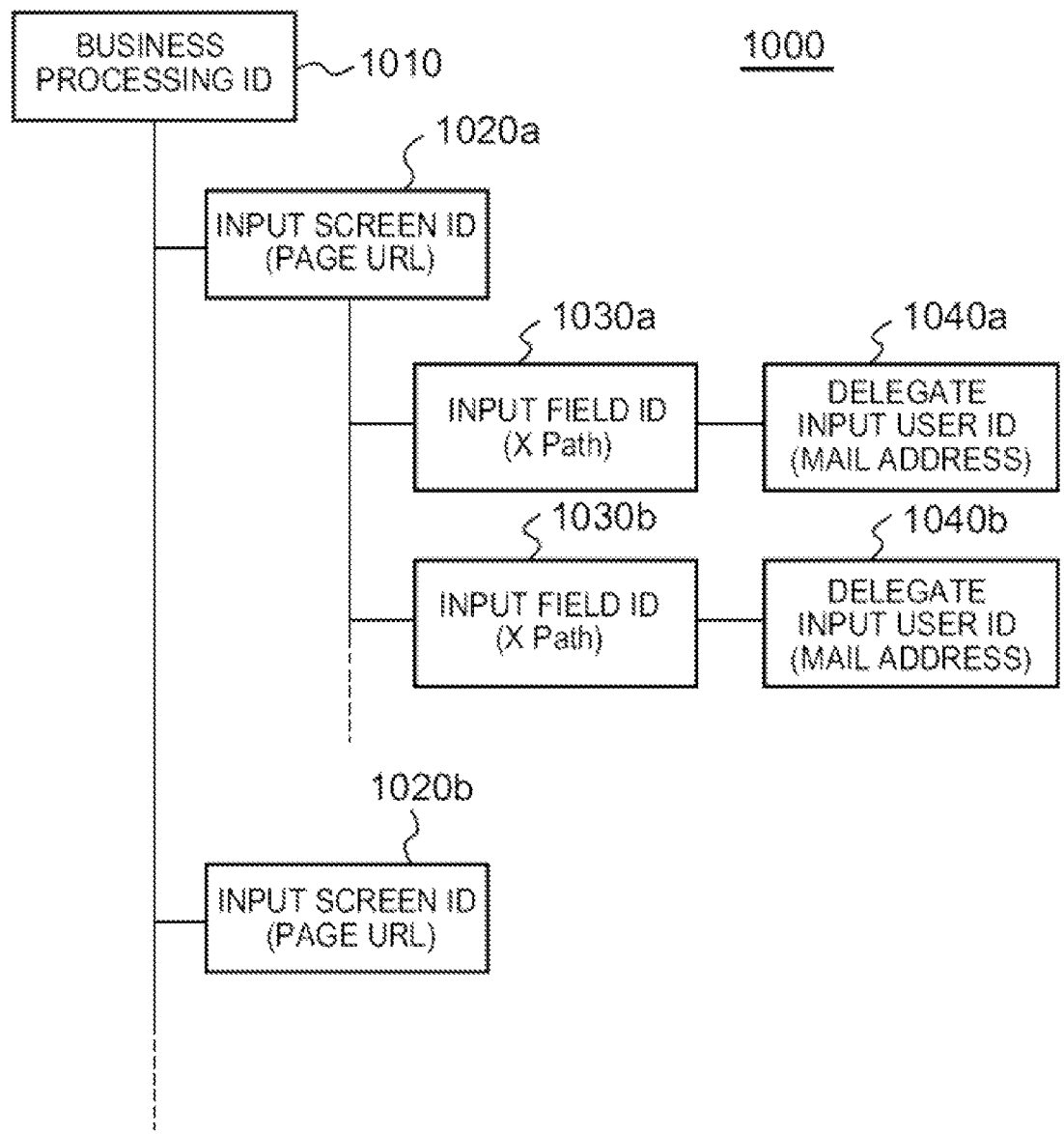
FIG. 10 illustrates a model structure recorded on an input user terminal in the data processing system of the described embodiment of the present invention.

FIG. 10 illustrates a model structure 1000 recorded on the primary user terminal 120a according to one embodiment of the present invention. The model structure 1000 has a hierarchical data structure (specifically, a tree structure) including a business processing ID 1010, input screen IDs 1020a through 1020n, input field IDs 1030a through 1030n, and delegate user IDs 1040a through 1040n. The input screen IDs 1020a through 1020n, the input field IDs 1030a through 1030n, and the delegate user IDs 1040a through 1040n are collectively referred to as "input screen ID 1020", "input field ID 1030", and "delegate input user ID 1040", respectively.

The root of the tree structure of the model structure 1000 is the business process ID 1010 that specifies the business process requested by the primary user from the application server 170. The business process IDs are allocated in advance to the respective business processes and should be known to or easily learned by the primary user before data entry operations begin.

At the next lower hierarchical level, the model structure 1000 has at least one input screen identifier ID 1020 for specifying an input screen for entering data necessary for performing the business process specified by the business process ID. In one embodiment of the present invention, only the input screen ID of the input screen including the input field for which a delegate user has been designated is included in the model structure. In one embodiment of the present invention, the input screen ID 1020 for specifying the input screen may be a URL (Uniform Resource Locator) for the corresponding input screen.

At the next lower hierarchical level, the model structure 1000 has an input field identifier for a particular input field included in the input screen specified by the input screen ID. In one embodiment of the present invention, only the input field ID of the input field for which the delegate user has been designated is included in the model structure.

At the next lower hierarchical level, the model structure 1000 has a delegate user ID 1040 for specifying the user to whom the task of providing data entry for the identified input field has been delegated. It is assumed in one embodiment of the present invention that an input field ID 1030 and a delegate user ID 1040 are always associated. In one embodiment of the present invention, the delegate user ID 1040 may be an e-mail address for the corresponding, designated user.

Figure 11:
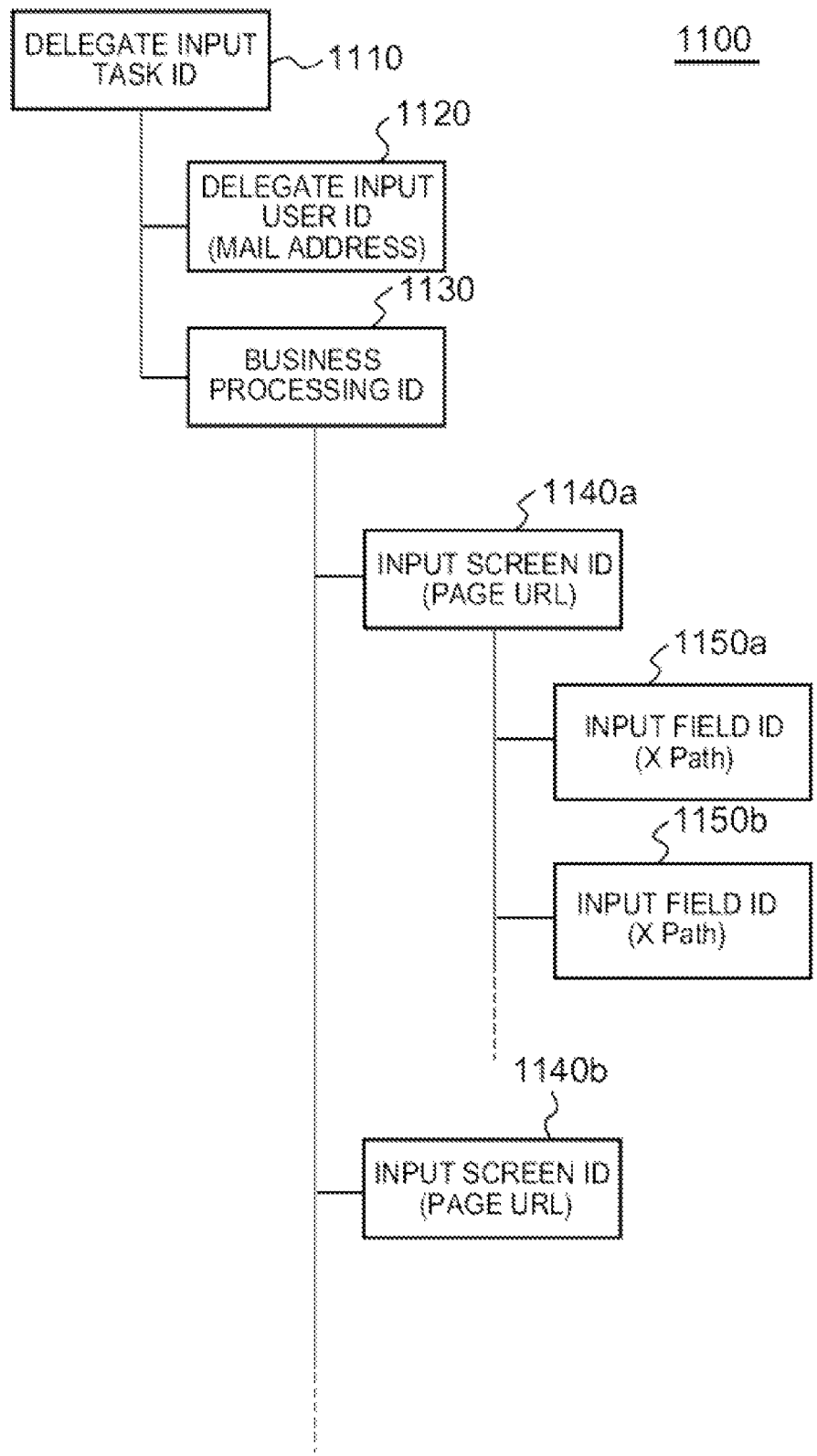
FIG. 11 illustrates a segmented task structure in the data processing system of the described embodiment of the present invention.

FIG. 11 illustrates a segmented task structure 1100 generated by the agent server 110 according to one embodiment of the present invention. The segmented task structure 1100 has a hierarchical data structure (specifically, a tree structure) including a delegate data entry task ID 1110, a delegate user ID 1120, a business process ID 1130, input screen IDs 1140a through 1140n, and input field IDs 1150a through 1150n. Herein, the input screen IDs 1140a through 1140n and the input field IDs 1150a through 1150n are collectively referred to as "input screen ID 1140" and "input field ID 1150", respectively.

The root of the segmented task tree structure 1100 is a delegate data entry task ID 1110 for specifying the data entry task assigned to a respective delegate user. In one embodiment of the present invention, the delegate data entry task IDs 1110 are associated with the delegate user IDs in the model structure 1000 received by the agent server 110, and the generated delegate data entry task IDs 1110 are each recorded as a root of the segmented task structure 1100.

At next lower hierarchical level, the segmented task structure 1100 includes a delegate user ID 1120 for specifying the delegate user who is responsible for performing the data entry task, and a business process ID 1130 generated from the business process ID 1010 of the model structure 1000.

The segmented task structure 1100 includes an input screen ID 1140 at a hierarchical level beneath the level having the business process ID 1130 and an input field ID 1150 at a hierarchical level beneath the level having the input screen ID 1140. The input screen ID 1140 and the input field ID 1150 of the segmented task structure 1100 are generated from the input screen ID 1020 and the input field ID 1030, respectively, of the model structure 1000. Only those screen and field ID's associated with the delegate user ID 1120 included in the segmented task structure 1100 are extracted and recorded.

Figure 12:
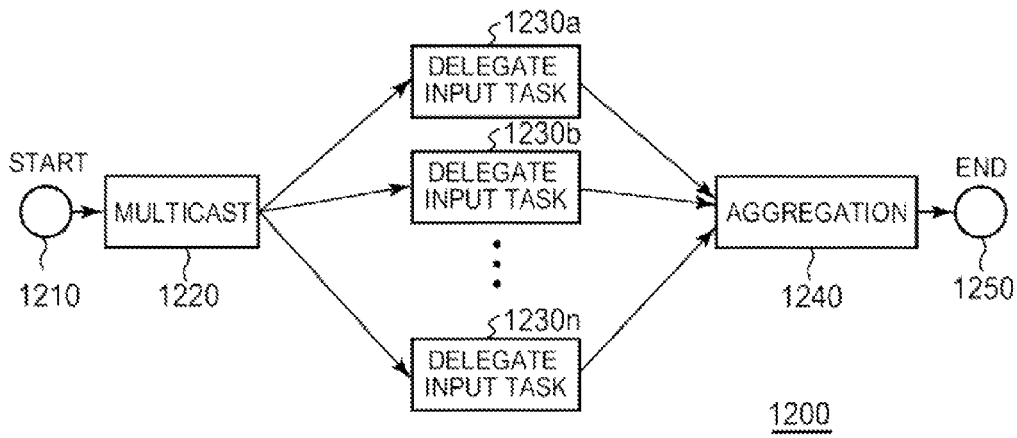
FIG. 12 illustrates a workflow process in the data processing system of the described embodiment of the present invention.

FIG. 12 illustrates a workflow process 1200 generated by the workflow server. The workflow process 1200 includes a start process step 1210, a multicast process step 1220, one or more delegate data entry tasks 1230a through 1230n processed in parallel (hereinafter, collectively referred to as "delegate data entry task 1230"), an aggregation process step 1240, and an end process step 1250.

The enterprise system 100 operates according to the workflow process 1200 in the following manner. When the workflow process 1200 is activated, the workflow process starts at the start process step 1210. In the multicast process step 1220, for each delegate data entry task 1230, a processing request of the delegate data entry task is transmitted to the delegate user terminal associated with the designated delegate user. Thereafter, the delegate data entry task is carried out in the delegate user terminal, and the input data entered by the delegate user is transmitted to the agent server 110.

Next, when every delegated data entry task 1230 has been completed, or more specifically, on the condition that notification of completion has been received from the agent server 110 that received the input data for all the delegate data entry tasks, the process proceeds to the aggregation process step 1240. In the aggregation process step 1240, an instruction to start the delegate processing is transmitted to the agent server 110, and then the process proceeds to the end process step 1250, where the workflow process is terminated.

The delegate user terminal 120b, in response to reception of the request for the delegate data entry task, starts the processing of the delegate data entry task 1230 included in the workflow process 1200 and assigned to the terminal user, to receive a data input from the designated delegate user into the corresponding input field.

Figure 9:
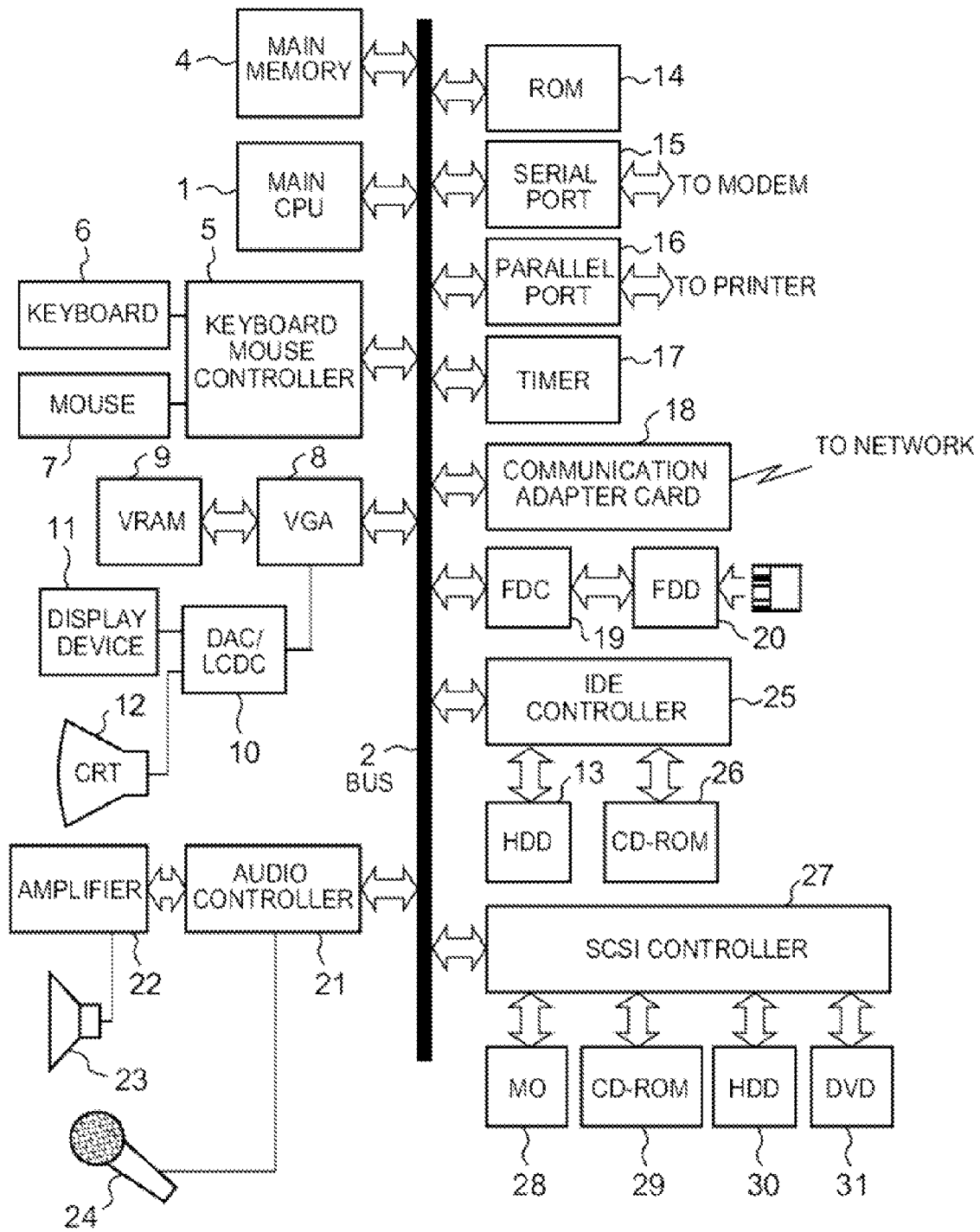
FIG. 9 shows an example of a hardware configuration of an information processing apparatus suitable for implementing the client and the servers according to the described embodiment of the present invention.

FIG. 9 shows an example of a hardware configuration of an information processing apparatus suitable for implementing the client and the servers according to the embodiment of the present invention. The information processing apparatus includes a CPU (Central Processing Unit) 1 and a main memory 4 connected to a bus 2. Further, hard disk drives 13, 30, and removable storages (external storage systems for which recording media can be exchanged) such as CD-ROM drives 26, 29, flexible disk drive 20, MO drive 28, and DVD drive 31, are connected to the bus 2 via a flexible disk controller 19, an IDE controller 25, an SCSI controller 27 and others.

The recording media such as flexible disk, MO, CD-ROM, and DVD-ROM are inserted into the removable storages. These recording media, the hard disk drives 13, 30 and a ROM 14 are capable of recording computer program codes for implementing the present invention by providing instructions to the CPU and others by cooperating with an operating system. The computer program is executed as it is loaded to the maim memory 4. The computer program may be compressed, or divided into a plurality of pieces, to be recorded on a plurality of media.

The information processing apparatus receives an input from input devices such as a keyboard 6 and a mouse 7 via a keyboard/mouse controller 5. The information processing apparatus is connected via a DAC/LCDC 10 to a display device 11 for providing visual data to a user.

The information processing apparatus can connect to a network via a network adapter 18 (Ethernet (R) card or token ring card) to communicate with other computers. The information processing apparatus can also connect to a printer via a parallel port, or to a modem via a serial port.

It will be apparent to those skilled in the art that various modifications or improvements are possible for the embodiment described above. For example, although the collaboration server, the user management server, and the workflow server are shown separately from the agent server in the embodiment of the present invention, it is possible to implement the servers with logically divided partitions existing on one and same package hardware. Alternatively, part or all of the functions provided by the servers that are necessary for accomplishing the present invention may be implemented as a software component introduced into the agent server.

In one embodiment of the present invention, the selection list is used for the input user to select a delegate user by communicating with the user management server. Alternatively, it may be configured such that, on the condition that a delegate user matching a specific notation method defined in advance for an input field is designated, the plug-in detects and interprets the same to specify the designation of the delegate.

While the normal mode or the delegate data entry mode is explicitly selected by the input user in one embodiment of the present invention, it may also be configured such that it is determined that the delegate and data entry mode is selected on the condition that the plug-in detects matching with the above-described specific notation method. In this case, it is preferable that the plug-in redirects the data transmission to the application server and the like to the agent server as required. Further, while the reproduction processing is carried out on the background in the embodiment of the present invention, it may be carried out on the foreground in order to provide the delegate input user with more information necessary for the delegate input operation.

In one embodiment of the present invention, the reproduction processing at the delegate input user terminal is performed through interaction with the application server. Alternatively, it may be configured such that the input user terminal records input screen data in the HTML/XML format and transmits the same to the agent server, and the agent server uses the received input screen data to provide a delegate input user with the interface for processing the delegate data entry task, without the need to interact with the application server.

While it is configured in one embodiment of the present invention that the primary user enters a tentative value together with designation of a delegate input user, it may also be configured such that the plug-in automatically allocates the tentative value based on the attribute of the input field and/or the input history in the past.

While the delegate processing file is executed in the browser environment of the agent server in the embodiment of the present invention, it may also be configured such that the agent server remotely controls the input user terminal and others so that the delegate processing is performed in the browser environment of the input user terminal.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for performing a computer-based process comprising:
    receiving one or more data inputs required by the computer-based process from a primary user, each of said data inputs being provided as a data entry into an input field on a data input display screen made available to the primary user;
    receiving, from the primary user, designations of one or more delegate user to whom responsibility of providing data inputs for particular input fields is delegated by the primary user;
    requesting data input from each delegate user to whom the responsibility of providing data input for a particular input field has been delegated by the primary user;
    receiving data input from at least one delegate user;
    executing the computer-based process using data inputs received from the primary user and one or more of the designated delegate users.

2. The method according to claim 1, wherein receiving, from the primary user, at least one designation of a delegate user to whom responsibility of providing a data input for a particular input field is delegated by the primary user further comprises receiving an identifier for each input field for which a delegate user is designated to provide a data input.

3. The method according to claim 2, wherein requesting data input from each delegate user to whom the responsibility of providing data input for a particular input field has been delegated by the primary user further comprises:
    generating a workflow process that comprises one or more delegate user data input tasks, each said delegate user data input task being based on a designation of a delegate user by the primary user; and
    performing the generated workflow process.

4. The method according to claim 3, wherein requesting data input from each delegate user to whom the responsibility of providing data input for a particular input field has been delegated by the primary user further comprises causing a data input display screen to be generated for use by the delegate user, said data input display screen including at least one input field to be completed by the delegate user.

5. The method according to claim 4, further comprising:
presenting an on-screen list of potential delegate users to whom the primary user may delegate the task of providing data inputs; and
receiving the primary user's designation of a delegate user as a selection of one of the delegate users included in the on-screen list.

6. The method according to claim 5, further comprising:
creating a record of data entry operations performed by the primary user, said record including designations of delegate users by the primary user; and
using the created record to generate said workflow process.

7. The method according to claim 6, further comprising receiving a tentative value from the primary user for one or more of the input fields for which data input responsibility has been delegated to a delegate user.

8. The method according to claim 7, further comprising replacing a tentative value received from the primary user with a data input received from a delegate user provided the tentative value and the data input received from the delegate user are for the same input field.

9. A non-transitory computer program product for performing a computer-based process, said computer program product comprising a computer usable storage medium having computer usable program code embodied therewith, said computer usable program code comprising:
computer usable program code configured to receive one or more data inputs required by the computer-based process from a primary user, each of said data inputs being provided as a data entry into an input field on a data input display screen made available to the primary user;
computer usable program code configured to receive, from the primary user, designations of one or more delegate user to whom responsibility of providing data inputs for particular input fields is delegated by the primary user;
computer usable program code configured to request data input from each delegate user to whom the responsibility of providing data input for a particular input field has been delegated by the primary user;
computer usable program code configured to receive data input from at least one delegate user;
computer usable program code configured to execute the computer-based process using data inputs received from the primary user and one or more of the designated delegate users.

10. The computer program product according to claim 9, wherein said computer usable program code configured to receive, from the primary user, at least one designation of a delegate user to whom responsibility of providing a data input for a particular input field is delegated by the primary user further comprises computer usable program code configured to receive an identifier for each input field for which a delegate user is designated to provide a data input.

11. The computer program product according to claim 10 wherein said computer usable program code configured to request data input from each delegate user to whom the responsibility of providing data input for a particular input field has been delegated by the primary user further comprises:
computer usable program code configured to generate a workflow process that comprises one or more delegate user data input tasks, each said delegate user data input task being based on a designation of a delegate user by the primary user; and
computer usable program code configured to perform the generated workflow process.

12. The computer program product according to claim 11, wherein said computer usable program code configured to request data input from each delegate user to whom the responsibility of providing data input for a particular input field has been delegated by the primary user further comprises computer usable program code configured to cause a data input display screen to be generated for use by the delegate user, said data input display screen including at least one input field to be completed by the delegate user.

13. The computer program product according to claim 12, further comprising;
computer usable program code configured to present an on-screen list of potential delegate users to whom the primary user may delegate the task of providing data inputs; and
computer usable program code configured to receive the primary user's designation of a delegate user as a selection of one of the delegate users included in the on-screen list.

14. The computer program product according to claim 13, further comprising:
computer usable program code configured to create a record of data entry operations performed by the primary user, said record including designations of delegate users by the primary user; and
computer usable program code configured to use the created record to generate said workflow process.

15. The computer program product according to claim 14, further comprising computer usable program code configured to receive a tentative value from the primary user for one or more of the input fields for which data input responsibility has been delegated to a delegate user.

16. The computer program product according to claim 15, further comprising computer usable program code configured to replace a tentative value received from the primary user with a data input received from a delegate user provided the tentative value and the data input received from the delegate user are for the same input field.

* * * * *